(12) United States Patent
Shimahara et al.

(10) Patent No.: US 6,229,686 B1
(45) Date of Patent: May 8, 2001

(54) MONOLITHIC CAPACITOR

(75) Inventors: Yutaka Shimahara; Shozo Takeuchi, both of Izumo (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/247,212

(22) Filed: Feb. 9, 1999

(30) Foreign Application Priority Data

Feb. 12, 1998 (JP) .................................................. 10-029718

(51) Int. Cl.⁷ ...................................................... H01G 4/06
(52) U.S. Cl. ........................ 361/311; 361/321.5; 361/322
(58) Field of Search ........................ 361/306.3, 309–313, 361/321.1–321.5, 322; 257/295

(56) References Cited

U.S. PATENT DOCUMENTS

| | | | |
|---|---|---|---|
| 4,607,316 | 8/1986 | Wada et al. | 361/321.4 |
| 5,117,326 | 5/1992 | Sano et al. | 361/321.4 |

FOREIGN PATENT DOCUMENTS

| | | |
|---|---|---|
| 0312817 | 9/1988 | (EP) . |
| 0690462 * | 1/1996 | (EP) . |
| 193059 | 2/1923 | (GB) . |
| 743700 | 10/1952 | (GB) . |
| 2303488 | 2/1997 | (GB) . |
| 58-56431 | 4/1983 | (JP) . |
| 60-76028 | 5/1985 | (JP) . |
| 62-120333 | 7/1987 | (JP) . |
| 62-210612 | 9/1987 | (JP) . |

OTHER PUBLICATIONS

European Search Report (in English) issued Dec. 1, 1999 in a related application.

* cited by examiner

*Primary Examiner*—Anthony Dinkins
(74) *Attorney, Agent, or Firm*—Ostrolenk, Faber, Gerb & Soffen, LLP

(57) ABSTRACT

A monolithic capacitor includes a sintered ceramic body having a sintered ceramic matrix, a plurality of internal electrodes deposited in the thickness direction in the sintered ceramic body, separated by the sintered ceramic matrix, and alternately extending to opposing two side faces of the sintered ceramic body. Top and bottom ceramic layers are provided above and below the sintered ceramic matrix. The sintered ceramic matrix is composed of a reduction-resistant $BaTiO_3$ ceramic. The top and bottom ceramic layers are composed of a reduction-resistant $CaZrO_3$ ceramic. The internal electrodes are composed of a base metal. The monolithic capacitor is suitable for middle- to high-voltage use requiring high withstand voltage.

2 Claims, 2 Drawing Sheets

MONOLITHIC CAPACITOR

BACKGROUND OF THE INVENTION

1. Field of the Invention

The present invention relates to monolithic capacitors having internal electrodes composed of base metals, which are suitable for middle- to high-voltage use requiring a high withstand voltage.

2. Description of the Related Art

Recently, surface mounting of electronic units has been in progress to satisfy the miniaturization of electronic device. As a result more compact electronic units have been used making it necessary to prove more compact monolithic capacitors with higher capacitance.

On the other hand, middle- to high-voltage capacitors with high withstand voltage have been used, for example, in back lights and switching power sources of liquid crystal displays. Requirements for such middle- to high-voltage capacitors are high withstand voltage, further miniaturization, and inexpensiveness.

In conventional middle- to high-voltage monolithic capacitors, suppression of discharge from the outer surfaces of the capacitors is an essential factor for achieving high withstand voltage. Various types of monolithic capacitors having high withstand voltage have been disclosed in, for example, Japanese Utility Model Application Laid-Open Nos. 60-76028, 62-120333, and 58-56431, and Japanese Patent Application Laid-Open No. 62-210612.

For example, in a proposed middle- to high-voltage monolithic capacitor with high withstand voltage, thick ceramic layers are provided above and below the capacitance extraction section composed of a plurality of overlapping internal electrodes, in order to suppress discharge from the top and bottom faces of a sintered ceramic body.

Japanese Patent Application Laid-Open No. 62-210612 discloses a monolithic capacitor with high withstand voltage in which ceramic layers with a relatively low dielectric constant are disposed above and below the capacitance extraction section including overlapping internal electrodes. The ceramic layers suppress flashover above and below the sintered body.

In these conventional middle- to high-voltage monolithic capacitors, thick ceramic layers are disposed above and below the capacitance extraction section; hence the monolithic capacitors are inevitably large, and do not satisfy the requirement for miniaturization and particularly lower heights.

Since these monolithic capacitors and a middle- to high-voltage monolithic capacitor disclosed in Japanese Patent Application Laid-Open No. 62-210612 have internal electrodes composed of noble metals, such as silver and silver-palladium, these are disadvantageous with regard to material costs.

On the other hand, conventional monolithic capacitor configurations capable of reducing material costs use base metals, such as nickel and copper, as internal electrode materials. Since base metals are readily oxidizable, a ceramic material having high reduction-resistant characteristics must be used in the production of monolithic capacitors by a monolithic ceramic firing technology. All the conventional monolithic capacitors are not suitable for middle- to high-voltage use and the ceramic materials used in these monolithic capacitors do not have high reduction-resistant characteristics capable of enhancing withstand voltage.

SUMMARY OF THE INVENTION

It is an object of the present invention to provide a monolithic capacitor which is free from disadvantages in conventional middle- to high-voltage monolithic capacitors.

It is another object of the present invention to provide a compact and inexpensive monolithic capacitor having high withstand voltage.

A monolithic capacitor in accordance with the present invention comprises a sintered ceramic body comprising a sintered ceramic matrix, a plurality of internal electrodes deposited in the thickness direction in the sintered ceramic body, separated by the sintered ceramic matrix, and alternately extending to opposing first and second side faces of the sintered ceramic body, and top and bottom ceramic layers provided above and below the sintered ceramic matrix, wherein the sintered ceramic matrix comprises a reduction-resistant ceramic comprising $BaTiO_3$, the top and bottom ceramic layers comprise a reduction-resistant ceramic comprising $CaZrO_3$, and the plurality of internal electrodes comprise a base metal.

Since the reduction-resistant ceramic layers comprising $CaZrO_3$ have a low dielectric constant compared with the reduction-resistant ceramic matrix comprising $BaTiO_3$, these layers are suitably used for formation of low-dielectric layers in a middle- to high-voltage monolithic capacitor. When these ceramic elements are fired in a reduction-resistant atmosphere, these are firmly bonded to each other due to interdiffusion therebetween. Accordingly, such a configuration allows the use of internal electrodes composed of an inexpensive base metal.

In the monolithic capacitor in accordance with the present invention, the side faces of the sintered ceramic matrix are preferably covered with a reduction-resistant ceramic comprising $CaZrO_3$.

DESCRIPTION OF THE PREFERRED EMBODIMENT

The present invention will now be described in detail with reference to the following non-limiting embodiments.

Figure 1:
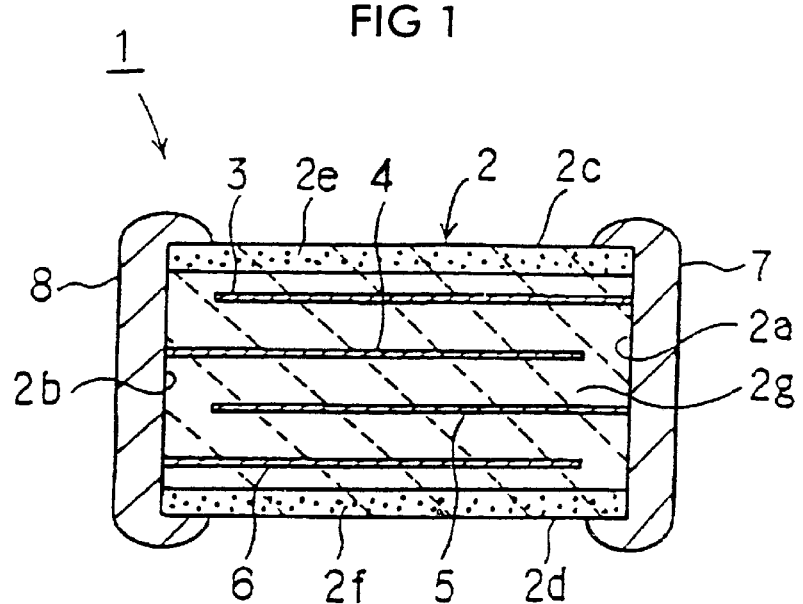
FIG 1 is a cross-sectional view of a monolithic capacitor in accordance with an embodiment of the present invention.

FIG. 1 is a cross-sectional view of a monolithic capacitor in accordance with an embodiment of the present invention. The monolithic capacitor 1 is composed of a rectangular parallelepiped sintered ceramic body 2. The sintered ceramic body 2 has opposing first and second end faces 2a and 2b as external electrodes. The interior of the sintered ceramic body 2 includes a plurality of internal electrodes 3 to 6 deposited in a sintered ceramic matrix 2g in the thickness direction of the sintered ceramic body 2. The internal electrodes 3 and 5 extend to the first end face 2a, whereas the internal electrodes 4 and 6 extend to the second end face 2b.

These internal electrodes 3 to 6 are composed of a base metal. Examples of usable base metals include nickel, copper, iron, cobalt, manganese, molybdenum, tungsten, titanium, and zirconium. The use of such base metals permits cost reduction of the monolithic capacitor 1.

The first and second end faces 2a and 2b of the sintered ceramic body 2 are covered with first and second external electrodes 7 and 8, respectively. In this embodiment, the first external electrode 7 covers the first end face 2a, whereas the second external electrode 8 covers the second end face 2b. The first and second external electrodes 7 and 8 extend towards the upper face 2c, the lower face 2d and the two side faces.

The external electrodes 7 and 8 may be formed by, for example, applying and firing a silver-palladium paste, a silver paste, a nickel paste, or a copper paste. Alternatively, the external electrodes 7 and 8 may be formed by depositing a desired conductive material by a thin-film deposition process, such as plating, vapor evaporation, or sputtering. The external electrodes 7 and 8 may be composed of a plurality of conductive material layers.

In the monolithic capacitor 1, the sintered ceramic matrix as a capacitor extraction section 2g is composed of a reduction-resistant ceramic comprising $BaTiO_3$ having a high dielectric constant. Further, top and bottom ceramic layers hereinafter referred to as low-dielectric layers) 2e and 2f composed of reduction-resistant ceramic comprising $CaZrO_3$ having a relatively low dielectric constant are provided above and below the capacitor extraction section. The low-dielectric layers 2e and 2f formed above and below the capacitor extraction section 2g suppress flashover at the top face 2a and the bottom face 2d of the sintered ceramic body 2 and contribute to higher withstand voltage of the monolithic capacitor 1.

Figure 2:
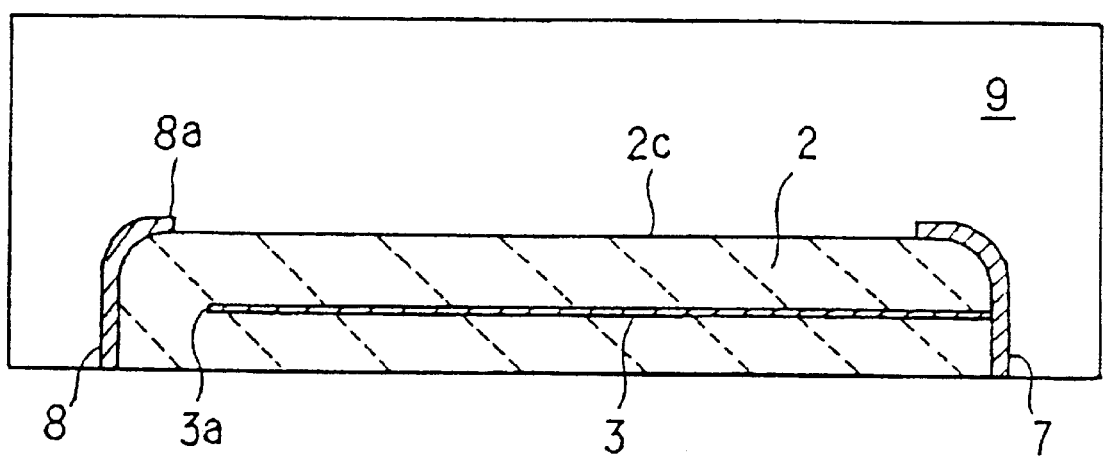
FIG. 2 is a schematic cross-sectional view for illustrating a discharging phenomenon in a conventional monolithic capacitor.

The phenomenon will now be described with reference to FIGS. 2 and 3. FIG. 2 is an enlarged schematic cross-sectional view of the upper portion of the monolithic capacitor 1. The top face 2c of the monolithic capacitor 1 is surrounded by atmospheric air 9. The external electrodes 7 and 8 extend towards the top face 2c. The uppermost internal electrode 3 in the sintered ceramic body 2 is connected to the external electrode 7 and has a potential which is different from that of the external electrode 8.

The upper end 8a, lying at the top face 2c of the sintered ceramic body 2, of the external electrode 8 is proximal to the end 3a, at the left side in the drawing, of the internal electrode 3, and thus a large electric field is applied between them. The electric field distribution of the monolithic capacitor in practical use was analyzed by a finite element method and the results obtained are as shown in FIG. 3.

Figure 3:
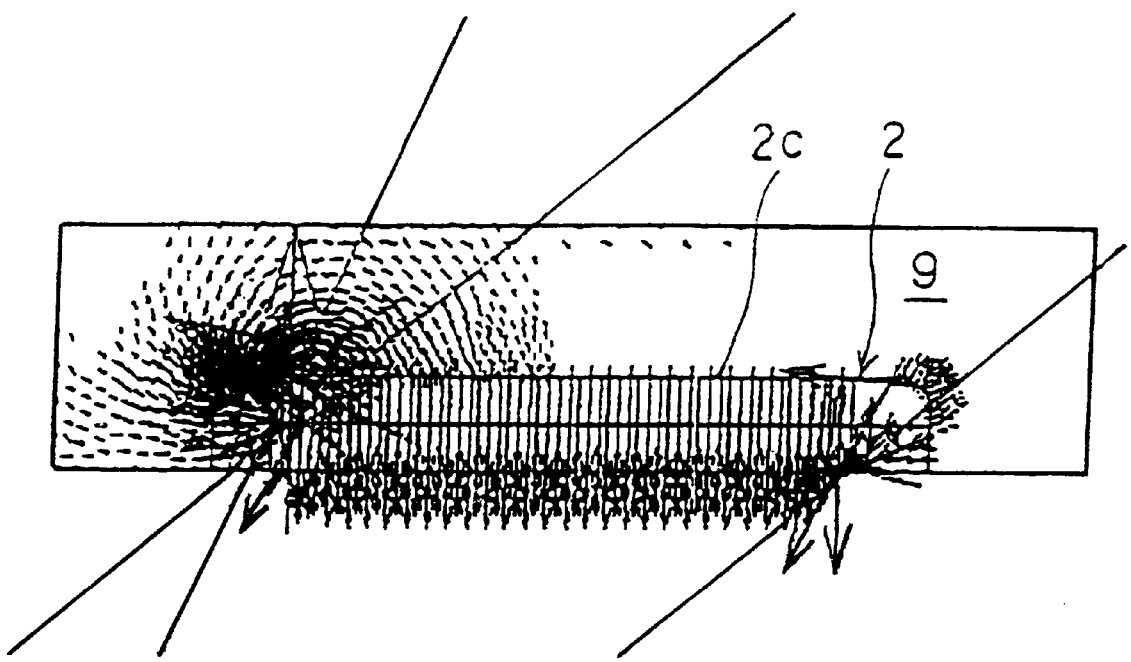
FIG. 3 is a schematic cross-sectional view for illustrating an electric field distribution, during being energized, which is analyzed by a finite element method, in a part of the monolithic capacitor shown in FIG. 2.

As clearly shown in FIG. 3, a large electric field is applied between the left end 3a of the internal electrode 3 and the upper end 8a of the external electrode 8, and the electric field spreads to the exterior of the sintered ceramic body 2. Such an electric field and particularly an electric field leaking towards the exterior of the top face 2c of the sintered ceramic body 2 triggers discharging. A larger leakage electric field causes discharge at a lower voltage.

Possible methods for reducing the leakage electric field include increasing the distance between the upper end 8a of the external electrode 8 and the left end 3a of the internal electrode 3, and increasing the thickness of only the top ceramic layer above the internal electrode 3. The thickness of the monolithic capacitor is, however, basically defined in the standards; hence, the larger the thickness of the top and bottom ceramic layers, the smaller the thickness of the inner ceramic layers must be within the restriction of a constant entire size, resulting in a decrease in electrostatic capacitance.

On the other hand, $BaTiO_3$ has a dielectric constant of 2,000 to 8,000 and $CaZrO_3$ has a dielectric constant of approximately 20 to 100.

When the thickness of the top and bottom ceramic layers above and below the capacitance extraction section 2g including the layered internal electrodes 3 to 6 is equal to that of a conventional capacitor having the top and bottom layers composed of the same dielectric material as that for the capacitor extraction section 2g, the monolithic capacitor 1 of this embodiment has a starting voltage of surface leakage which is approximately 20 to 30% higher than that of the conventional capacitor. Thus, flashover is suppressed and its withstand voltage is improved without an increased thickness of the sintered ceramic body. Accordingly, miniaturization and higher capacitance are simultaneously achieved.

In monolithic capacitors, use of base metals such as nickel and copper as internal electrodes has been attempted in order to achieve cost reduction. Since these base metals are highly oxidizable, the sintered ceramic body 2 and the internal electrodes 3 to 6 must be fired in a neutral or reducing atmosphere.

When the internal electrodes 3 to 6 are composed of a base metal, the dielectric ceramic material used must have high reducing-resistant characteristics. The dielectric ceramic comprising $BaTiO_3$ and the dielectric ceramic comprising $CaZrO_3$ used in this embodiment are reduction-resistant dielectric materials. Thus, when the monolithic capacitor 1 in this embodiment having the internal electrodes 3 to 6 composed of a base metal is fired in a reducing atmosphere, the capacitor extraction section 2g comprising $BaTiO_3$ and lying in the center and the low-dielectric layers 2e and 2f comprising $CaZrO_3$ can be surely fired in the reducing atmosphere.

A monolithic capacitor is generally composed of a sintered ceramic body made by firing a layered composite of ceramic green sheets separated by internal electrodes therebetween. When the sintered ceramic body is composed of different types of ceramic materials as in the monolithic capacitor of the present invention, the essential conditions for the monolithic capacitor are (1) the sintering temperatures of these materials must be near to each other; (2) adequate interdiffusion must occur at the junctions to secure tight bonding between the different materials; (3) excessive diffusion adversely affecting the inner dielectric ceramic material should not occur; and (4) stress due to shrinkage and thermal expansion should not cause rupture. Both $BaTiO_3$ and $CaZrO_3$ satisfy these conditions. As a result, the monolithic capacitor 1 has high withstand voltage, and thus is capable of achieving miniaturization and higher capacitance.

An example of the monolithic capacitor in accordance with the present invention will now be described.

A ceramic slurry for a capacitor extraction section 2g was prepared as follows. Powdered $BaTiO_3$ as a primary component, a powdered rare earth oxide, a powdered alkaline earth oxide were mixed, and these were mixed with a vinyl acetate binder, a dispersant, a plasticizer, and water as a solvent. Using the ceramic slurry, first ceramic green sheets for a capacitor extraction section were formed.

Another ceramic slurry for a low-dielectric layer was prepared as follows. $CaZrO_3$ as a primary component, 3 percent by weight of powdered glass composed of silicate of at least one oxide selected from the group consisting of alkaline tin types, alkaline earth tin types, and aluminum types as a firing promoter, and 1 mole percent of $MnO_2$ as an acceptor to the $CaZrO_3$ primary component were compounded. A vinyl acetate organic binder, a dispersant, a plasticizer, and water as a solvent were added thereto and mixed to prepare a ceramic slurry. Using the ceramic slurry, second ceramic green sheets for top and bottom low-dielectric layers were formed.

A nickel conductive paste was printed on the first ceramic green sheets to form internal electrodes. A predetermined number of second ceramic green sheets were overlaid to form a bottom low-dielectric layer, the first ceramic green sheets with internal electrodes were overlaid according to the number of the internal electrodes 4 in the monolithic capacitor 1, and then a predetermined number of second ceramic green sheets were overlaid to form top low-dielectric layers.

The composite was pressurized in the thickness direction to form a green compact. The green compact was degreased at approximately 400° C. in an oxygen-nitrogen mixed gas stream, and then fired at approximately 1,300° C. in a nitrogen-hydrogen mixed gas stream. A sintered ceramic body 2 with a length of 3.2 mm, a width of 1.6 mm, and a thickness of 1.0 mm was obtained in such a manner. In this sintered ceramic body 2, the thickness of the ceramic layer between the two adjacent internal electrodes lying in the thickness direction was 0.1 mm, and the thickness of the top and bottom low-dielectric layers 2e and 2f was 0.15 mm.

A silver or copper metal electrode paste was applied to the first and second end faces 2a and 2b of the resulting sintered ceramic body, and then baked. Nickel and tin or nickel and solder were plated on their outer faces to form external electrodes 7 and 8. A monolithic capacitor 1 was thereby obtained.

Figure 4:
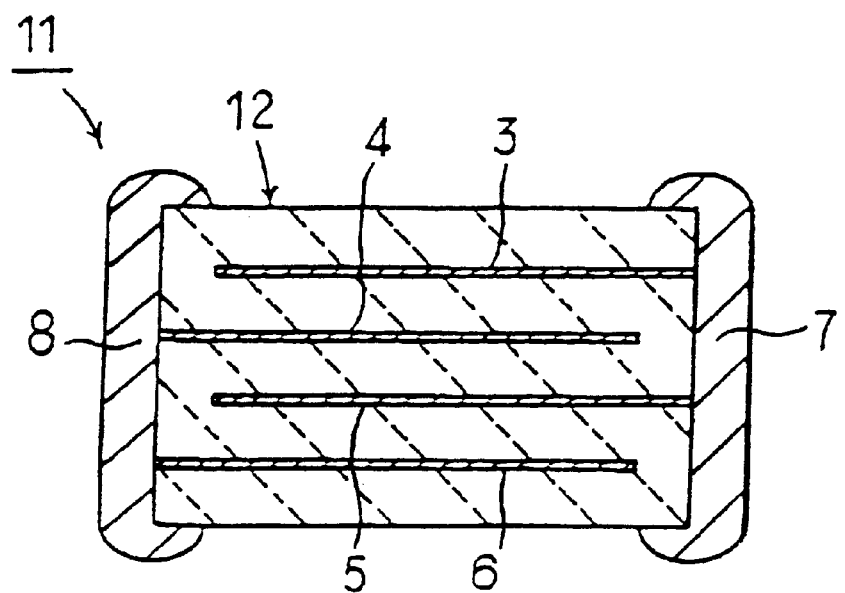
FIG. 4 is a cross-sectional view of a conventional monolithic capacitor for comparison.

A monolithic capacitor for comparison was produced as in the above process, except that the first ceramic green sheets instead of the second ceramic green sheets were also used to form top and bottom ceramic layers. FIG. 4 shows a configuration of the resulting monolithic capacitor for comparison. As shown in FIG. 4, the sintered ceramic body 12 in the monolithic capacitor 11 for comparison has a uniform composition comprising $BaTiO_3$.

A direct current was applied to the monolithic capacitor 1 in accordance with the present invention and the monolithic capacitor 11 for comparison to measure discharge-starting voltages on their surfaces. The discharge-starting voltage of the monolithic capacitor 11 for comparison was 2,000 volts, whereas that of the monolithic capacitor 1 in accordance with the present invention was 2,600 volts. Thus, the provision of the top and bottom low-dielectric layers 2e and 2f comprising $CaZrO_3$ enables a higher discharge-starting voltage on the surface without increasing the size of the monolithic capacitor.

The top and bottom low-dielectric layers 2e and 2f were formed above and below the capacitor extraction section 2g including layered internal electrodes 3 to 6 in this example. The side faces of the capacitor extraction section 2g may be covered with a reduction-resistant dielectric ceramic comprising $CaZrO_3$ to further increase the discharge-starting voltage on the surface.

In the monolithic capacitor in accordance with the present invention, the capacitor extraction section disposed between the plurality of internal electrodes comprises a $BaTiO_3$ reduction-resistant ceramic having a relatively high dielectric constant, whereas the top and bottom faces of the capacitor extraction section comprise a $CaZrO_3$ reduction-resistant ceramic having a relatively low dielectric constant. Thus, discharge from the top and bottom faces can be suppressed to increase the withstand voltage. That is, the top and bottom of the capacitor extraction section are composed of a reduction-resistant ceramic comprising $CaZrO_3$; hence the withstand voltage can be increased without an increased thickness.

Both the reduction-resistant $BaTiO_3$ and $CaZrO_3$ ceramics can be fired in a reducing atmosphere and firmly bonded to each other. Thus, the internal electrodes can be formed of a highly oxidizable base metal; hence the material cost of the monolithic capacitor can be reduced. Accordingly, a compact and inexpensive monolithic capacitor having high withstand voltage suitable for middle- to high-voltage use can be provided.

In a preferred embodiment of the sintered ceramic body, the side faces of the capacitor extraction section or the sintered ceramic material is covered with a $CaZrO_3$ reduction-resistant ceramic. Thus, the flashover on the side faces of the sintered ceramic body 2 can be effectively suppressed. Accordingly, a monolithic capacitor having a further improved withstand voltage can be provided.

What is claimed is:

1. A monolithic capacitor comprising a sintered ceramic body comprising:

a sintered ceramic matrix comprising a reduction-resistant ceramic including $BaTiO_3$;

a plurality of overlapping internal electrodes formed of a base metal and located in the sintered ceramic body, separated by the sintered ceramic matrix, and alternately extending to opposing first and second side faces of the sintered ceramic body; and top and bottom ceramic layers provided above and below the sintered ceramic matrix, said top and bottom ceramic layers being formed of material which is different than the material of said sintered ceramic matrix and comprising a reduction-resistant ceramic including $CaZrO_3$.

2. A monolithic capacitor according to claim 1, wherein the side faces of the sintered ceramic matrix are covered with a reduction-resistant ceramic comprising $CaZrO_3$.

* * * * *